United States Patent

[11] 3,599,336

| [72] | Inventor | Robert R. Walsh<br>Wilmington, Del. |
|---|---|---|
| [21] | Appl. No. | 777,778 |
| [22] | Filed | Nov. 21, 1968 |
| [45] | Patented | Aug. 17, 1971 |
| [73] | Assignee | Technidyne, Inc.<br>Wilmington, Del. |

[54] PIPE TARGET SYSTEM AND METHOD FOR ALIGNING PIPES AND THE LIKE WITH LASER BEAMS
8 Claims, 10 Drawing Figs.

[52] U.S. Cl. .................................................. 33/46, 33/1,
33/74, 248/168
[51] Int. Cl. ........................................................ G01c 15/12
[50] Field of Search ............................................. 33/1 H, 74,
46.2, 46; 248/168

[56] References Cited
UNITED STATES PATENTS

| 685,455 | 10/1901 | Kinkead | 33/46 (.2) |
|---|---|---|---|
| 1,662,836 | 3/1928 | Steinle | 33/46 (.2) |
| 2,300,915 | 11/1942 | Florence | 248/168 |
| 2,669,024 | 2/1954 | Flanagan | 33/46 (.2) |
| 2,788,578 | 4/1957 | Digiacinto | 33/74 (A) |
| 2,896,891 | 7/1959 | Ernst | 248/168 |
| 3,314,068 | 4/1967 | Verive | 33/74 (A) |

FOREIGN PATENTS

| 172,056 | 10/1965 | U.S.S.R. | 33/46 (.2) |
|---|---|---|---|

*Primary Examiner*—William D. Martin, Jr.
*Attorney*—Birch and Birch

ABSTRACT: Target structures and a system and method for aligning pipe sections to a laser beam with same are provided which are substantially universally adaptable to position a reference index at the centerline of a pipe section, internally thereof, with a minimum number of adjustments. The target structures comprise a unique three-point mounting structure which once adjusted for a given pipe size, may be thereafter placed in the same size pipe without any adjustment and will constrain the reference point indicia thereon corresponding to that pipe size on the axial centerline of that pipe section in which it is inserted. When a target having symmetrical perforations is placed in one end of a pipe section and a target having a translucent surface with reference marks thereon is placed in the other end of that section, if the pipe is positioned such that a laser beam aimed through the perforation of one target and onto the corresponding reference mark of the other, the pipe section will be constrained to a position in which its axial centerline is coincident with the laser beam.

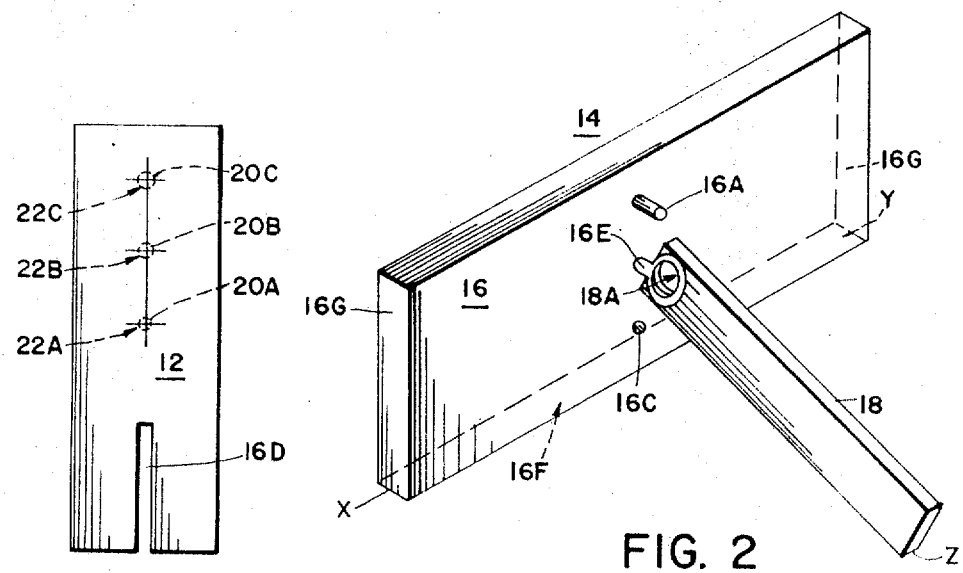
FIG. 1
FIG. 2
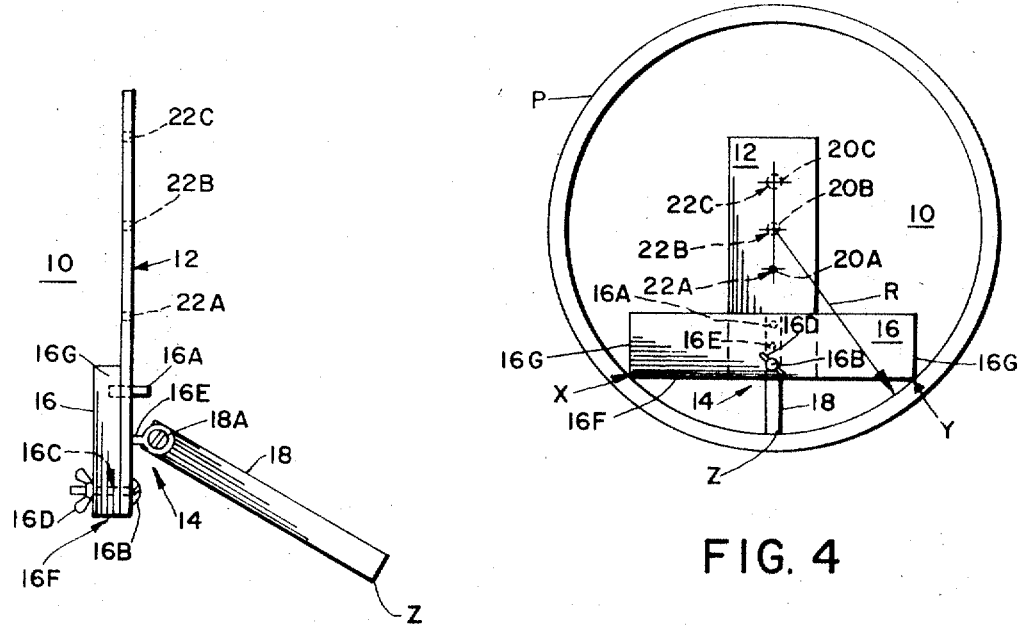
FIG. 3
FIG. 4
INVENTOR
ROBERT R. WALSH
BY Birch & Birch
ATTORNEYS

INVENTOR
ROBERT W. WALSH

BY Birch & Birch
ATTORNEYS

PIPE TARGET SYSTEM AND METHOD FOR ALIGNING PIPES AND THE LIKE WITH LASER BEAMS

This invention relates to sensing and readout means and methods for detecting and indicating the presence of an established laser beam in space and, more particularly, to visually readable target structures and mounting means for same and methods to effect the positioning of the inner, longitudinal axis of a tubular conduit or the like at a locus substantially coincident with an established laser beam.

In the laying of sewer pipe and the like, coincident with a predetermined grade and subsurface level, it is requisite that individual conduit or pipe sections be substantially coaxially aligned along a given grade reference line. For pipe sections of like diameter joined together in a pipe string, one method of achieving such a coaxial alignment is to establish a fixed laser beam, in space, as a grade reference line and then to constrain the inner, longitudinal axis of each pipe section in the string to coincide with the predetermined space orientation of the laser reference line.

In order to effect such a coincidence of locus, a rapid and accurate means of determining the position of the inner longitudinal axis of a cylindrical pipe or tubular conduit section must be available.

Where accurate determination of the locus of a reference laser beam is desired, it is often necessary to target, i.e., impinge, the fixed laser beam on a target means placed in its path and effect a visual readout of the targeted condition by utilizing the "red glow" or resulting scattered light from the laser beam which has engaged an obstacle such as the surface of a target device.

It is, therefore, an object of this invention to provide new and novel laser beam target structures which are specially adapted to be placed within a cylindrical pipe or tubular conduit and effect, automatically, the substantially exact location of the inner central longitudinal axis of such pipe or conduit.

Another object of this invention is to provide a new and novel method of laying pipe or conduit to a degree of accuracy and with a degree of facility heretofore unattainable in the art.

Still another object of this invention is to provide new and novel laser beam target structures which, when used in combination with an established laser beam in the space defined internally of a pipe or tubular conduit provide a new and novel system and method for effecting coaxial alignment of a plurality of pipe or conduit sections in a pipe string along a given predetermined grade line.

Still another object of this invention is to provide new and novel laser beam target structures, including mounting means of adjustable construction, which are adapted to be self-centering internally of a wide range of diameters of pipes and conduits.

Yet another object of this invention is to provide new and novel laser beam target structures, including mounting means of adjustable construction, which are adapted to be self-centering internally of a wide range of diameters of pipes and conduits; and which include new and novel reference mechanisms therein for maintaining strict control of the relative orientation of the component parts of such target structures.

These and other objects of this invention will become more fully apparent with reference to the following specification and drawings which relate to several preferred embodiments of the invention.

In the drawings:

FIG. 1 is a front plan detail of the target component of one embodiment of the invention;

FIG. 2 is a perspective of the mounting means or standard for holding the target component of FIG. 1;

FIG. 3 is a side elevation of the target component of FIG. 1 assembled with standard of FIG. 2;

FIG. 4 is a front plan view of the assembled target structure of FIG. 3 shown within a pipe or conduit;

Figure 5:
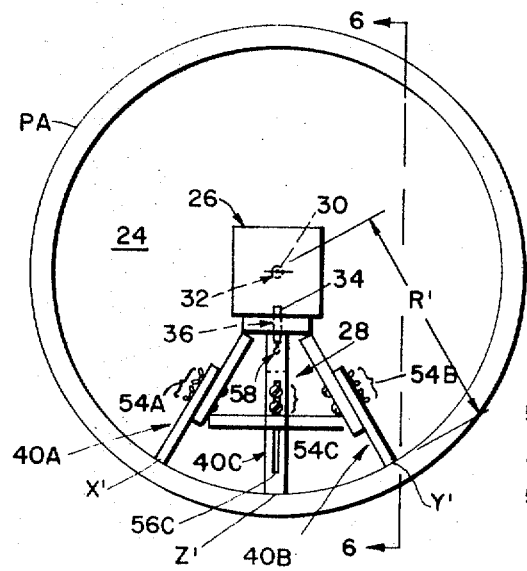
FIG. 5 is a front plan view of another embodiment of a target structure of the present invention shown in position within a pipe or conduit.

Basically, the invention contemplates the provision of an indexed target surface or screen upon which a laser beam is adapted to be impinged. The target surface is one face of a sheet of translucent or lenticular material which will effect a scattering of the coherent light of a laser beam when the latter is impinged thereon. A standard or mounting structure is provided for the target screen which is of a unique and novel configuration effecting the automatic registry of a given index or one of a plurality of indices on the target screen with the inner longitudinal axis of a pipe of conduit of circular cross section when the target is placed within such a pipe or conduit in a plane substantially normal to such longitudinal axis.

Further, it is contemplated that such targets and mounting means shall be used within a pipe or conduit section in combinations of two or more, with an established laser beam, and that the target means closest to the point of propagation of the established beam shall have an aperture coincident with the reference index or each of the reference indices on the target screen of the target means. In this manner, the laser beam can be propagated through the near target means and the entire pipe section to the more remote target means and effect a two-point registry of the inner longitudinal axis of the said pipe section with the centered target indices. Thus, the locus of the said inner longitudinal axis of the said pipe section can be made readily coincident with the established laser beam by adjusting the position of the pipe section until the said laser beam is in registry with the inner longitudinal axis (pipe center line) indices on both of the spaced target means.

THE TARGET DEVICES

Referring in detail to the drawings and in particular to FIGS. 1, 2, 3 and 4, a target means 10 of the present invention is shown as generally comprising target screen 12 and a target standard 14, the latter comprising a two-point mounting base 16 and an extended support leg 18.

The target screen 12 is shown in FIGS. 1, 3 and 4 as comprising a rectangular sheet of material such as light diffusing glass or plastic, e.g., plexiglass P–80, one-eighth inch thick light diffuser material.

Upon the obverse surface of the screen 12 are several index points 20A, 20B and 20C, corresponding, respectively, to the center line positions of various diameter pipe or conduit sections, such as the pipe section P shown in FIG. 4. In this FIG., the index 20B and aperture 22B are coincident with the center line of the pipe section P as shown by the radius line R therein.

On one form of the screen 12, the index points 20A, 20B and 20C are coincident, respectively, with the centers of a like plurality of circular apertures 22A, 22B and 22C. These apertures are necessary in at least one of a plurality of such target means 10 in a system for aligning the pipe section P such that its inner longitudinal axis or "center line" is constrained to a locus coincident with an established laser beam as will be hereinafter more fully described.

The target screen 12 is bifurcated at its lower end to form a vertical mounting slot 12A therein which extends upwardly from the lower edge thereof, in line with the target indices 20A—20C.

The mounting slot 12A is adapted to receive a guide pin 16A, integral with the base block 16, and a retaining bolt 16B, extending through a port 16C in the base block 16, the said retaining bolt and the target screen being securable to the base block 16 by a wingnut 16D. Further, the slot 12A receives a mounting stud 16E, which is integral with the base block 16, mounts a frictional pivot means 18A, the latter maintaining the support leg 18 pivotally mounted in a common plane, orthogonal to the plane of the mounting block 16 and target screen 12, the said common plane including the axes of the guide pin 16A, retaining bolt 16B, port 16C and mounting stud 16E.

The lower edge surface 16F and the vertical end surfaces 16G of the base block 16 are orthogonally related planes which are, in turn, mutually orthogonal with the obverse plane of the target screen 12. Thus, the end surfaces 16G are parallel to the plane in which the support leg 18 is pivoted.

The reason for this relationship will become more readily apparent hereinafter in the description of the operation of the target device 10.

A second embodiment of the present invention, suitable for in-pipe use in relatively large diameter pipe sections, will now be described with reference to FIGS. 5, 6, 7, 8 and 9.

Figure 6:
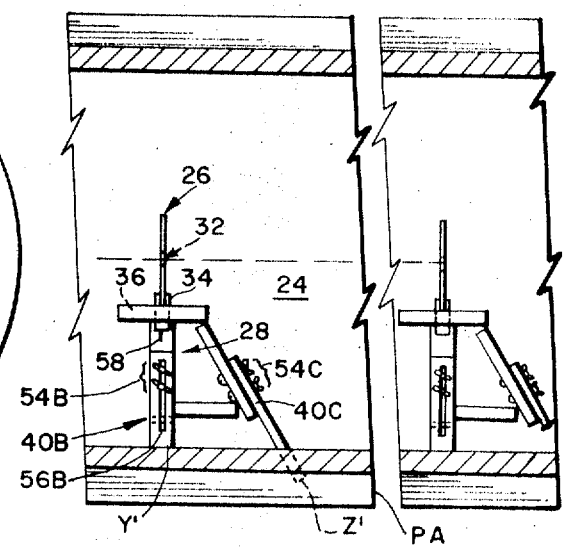
FIG. 6 is a cross section taken along line 6—6 of FIG. 5.

With particular reference to FIGS. 5 and 6, a target device 24 is shown as generally comprising a translucent or lenticular target screen 26 mounted on an adjustable standard 28. The target device 24 is shown within a pipe section PA of relatively large diameter compared to the diameter of the pipe section P of FIGS. 1 through 4.

The target screen 26 takes two forms, as generally disclosed in the previous embodiment, in that it may be provided, selectively, with either an index mark 30 on the obverse face thereof which is adapted to be coincident with the center line of the pipe section PA or with an aperture 32 coincident with the said center line in combination with some part of the index mark 30. A vertical dowel 34 is provided integral with the target screen 26 to permit it to be removably mounted in a socket 36 in the mounting block 38.

In all of the embodiments of the present invention, the index marks 20 and 30 may comprise any suitable target markings such as bullseyes, crosshairs and the like, having either an aperture or distinct graphic marking at the desired point of reference.

Figure 7:
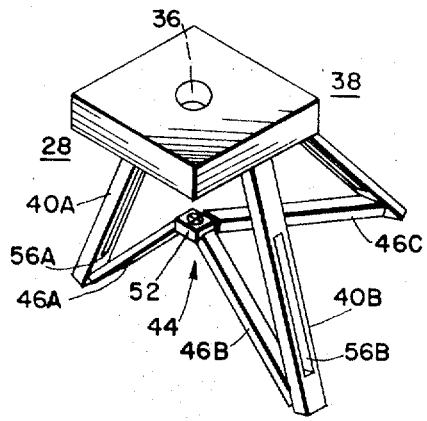
FIG. 7 is a perspective of a detail of the mounting means or standard of the target structure of FIGS. 5 and 6.
Figure 8:
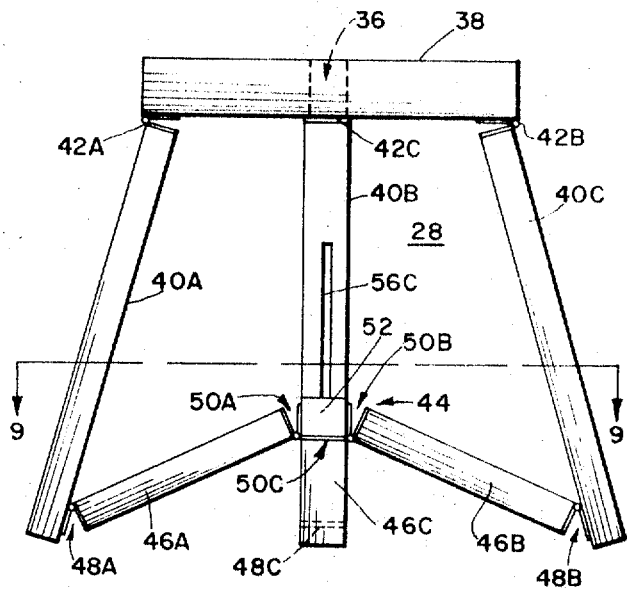
FIG. 8 is an enlarged front plan view of the standard of FIG. 7 illustrating the hinged interrelationship of the component parts thereof.
Figure 9:
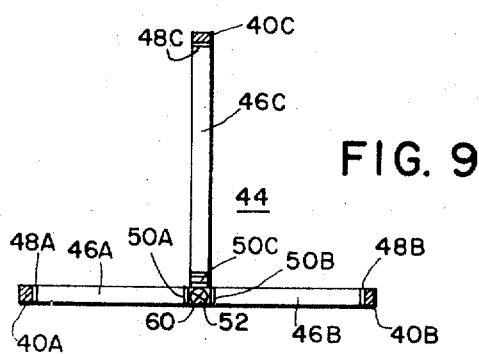
FIG. 9 is a cross section taken along line 9—9 of FIG. 8.

The target standard 28, referring additionally to FIGS. 7, 8 and 9, comprises a top mounting clock 38 having the socket 36 therein for receiving the target screen mounting dowel 34; first, second and third extensible legs 40A, 40B and 40C dependently mounted on the lower surface of the said mounting block 38 by first, second and third inwardly opening hinge means 42A, 42B and 42C, respectively; and an orientation linkage system 44, interconnected with the said extensible legs 40A—40B—40C, in a plane beneath the said mounting block 38, to constrain the said extensible legs to fixed angular positions with respect to the plane of the mounting block 38.

The orientation linkage 44, is partially comprised of first, second and third links 46A, 46B and 46C attached on their outer ends, respectively, through first, second and third downwardly closing hinge means 50A, 50B and 50C to three respective sides of a square index block 52, the sides of the latter and the said inner ends of the said links 46A—46C, being so shaped and so proportioned as to engage upon full closure of the said upwardly closing hinges 50A—50C to constrain all of the said links 46A—46C in a selected relative orientation, which, in the embodiment shown, is a common horizontal plane (see FIGS. 5, 6 and 9).

Each of the extensible legs 40A—40C comprises two sections, one of which is held on the other by means of release couplings 54A, 54B and 54C, respectively, engaged in longitudinal guide slots 56A, 56B and 56C, respectively, extending through both sections of each such extendable leg. Thus, each of the legs 40A—40C is longitudinally adjustable over a wide range of desired leg lengths.

The first two extensible legs 40A and 40B are hinged in a first common plane with the first and second orientation links 46A and 46B in the orientation linkage 44.

The third extensible leg 40C and the third orientation link 46C are hinged in a second common plane which is orthogonally disposed to the plane of the legs 40A—40B and orientation links 46A—46B as well as orthogonally disposed to the plane of the mounting block 38. It can also be said that both the said first and second common planes contain the index mark 30 of the target screen 26 and that the line of intersection of the said planes comprises the longitudinal axes of both the target mounting dowel 34 and mounting socket 36 of the target assembly 24.

Thus, a substantially true vertical orientation of the target screen can be effected by the use of a plumb bob, not shown, by the provision of an axially disposed hanger or hook 58 on the lower end of the mounting dowel 34 and an orientation index mark 60 at the center of the upper surface of the index block 52; the said orientation index mark 60 and the target index mark 30 both being on the axis of the dowel 34 when the orientation linkage is in its stable planar configuration of FIGS. 5, 6 and 9. Therefore, the orientation index mark 60 on the index block 52 is in the plane of the target screen 26 when the orientation linkage 44 is in its stable planar configuration.

OPERATION

A. Embodiment of FIGS. 1, 2, 3 and 4:

Assuming that the pipe section P of FIG. 4 has a radius R which is of a length most closely adapted to the center target index 20B (or center of the aperture 22B) on the target screen 12, the target screen 12, with the wing nut 16B loosened, is vertically positioned on the guide pin 16A and the bolt 16B via the guide slot 16D until the center index mark 20B is exactly the distance R from the lower outer corners X and Y, respectively, of the base block 16, the said corners comprising the intercepts of the end surfaces 16G and the lower edge surface 16F of the said base block 16.

Because of the orthogonal interrelationship of the intercepts or corners X and Y to the obverse plane of the target screen 12, when the target device 10 is placed in a pipe section P, the corners X and Y are constrained to effect full line contact with the inner walls of the pipe section P by pivotally adjusting the extended support leg 18 such that the lower corner Z thereof engages the lowermost portion of the inner walls of the pipe section P. When this line contact is effected, the projection of the corner Z on the obverse plane of the target screen 12 will be displaced from the center target index 20B at a distance substantially equal to the internal radius R of the pipe section P and the selected center target index 20B (or center of the aperture 22B) will automatically have been constrained to a position in space coincident with the center line (longitudinal axis) of the pipe section P.

As can now be clearly understood from FIG. 4, the obverse plane of the target screen 12, once it is established orthogonally with respect to the pipe center line by the foregoing procedure, need not be in the true vertical position shown, but may assume any degree of lateral tilt permitted by gravity, without moving the center index mark 20B (or center of the aperture 22B) off the center line of the pipe section P. This is because the index marks 20A—20C are on a line perpendicular to a cord of the circular internal cross section of the pipe P at a radial distance from the inner periphery thereof.

In regard to the operation of this embodiment, it should be clearly understood that other methods of establishing the proper declination angle of the support leg 18 or relative position of its lowermost corner Z to achieve the foregoing results are fully contemplated by the present invention.

In pipes of relatively small internal diameter, such as, for example, less than 50 inches, a selection of target screens 12 can be provided to readily adapt the target device 10 to various pipe sizes.

Even if the specific line contact of the base clock edges X and Y cannot be effected due to wear and tear on the base block or other causes, a generally vertical orientation can be effected with respect to the pipe center line by the adjustable support leg 18 and the deviation error between the locus of the center index mark 20B and that of the pipe center line will be negligibly small.

It will be readily apparent that a variety of target screen sizes can be supplied for use interchangeably with an individual base block to cover a wide range of pipe sizes. The range covered by any one screen is limited by the fact that when mounted on its base it must fit into the smallest diameter pipe for which it is designed. The position of each index mark on a target screen designed for more than one pipe size must take into account the fact that a base block subtending a chord of fixed length will sit lower in a pipe with respect to that pipe's longitudinal centerline as the diameter of the pipe increases. Considering these factors, it is easily possible to provide four separate target screens for example which will cover all pipe diameters from 8 inches to 54 inches when selectively mounted on one base block.

B. Embodiment of FIGS. 5, 6, 7, 8 and 9:

Where internal pipe diameters range from 50 inches upward, for example, to 96 inches and more, the target device 10 of the embodiment of FIGS. 1, 2, 3 and 4 becomes too fragile for practical handling and/or relatively inaccurate in use due to the fixed length of the cord subtended by the base block 16.

The "points" or lines of contact of the lower ends of the extensible support legs 40A, 40B and 40C, with the inner periphery of the pipe section PA, are represented, respectively, as X' Y' and Z'.

In order to set up the target device 24 for effecting automatic centering or coincidence of the target index 30 (or center of the aperture 36) of the target screen 26, with the center line of any given pipe section PA of a prescribed internal diameter, the orientation linkage 44 is first forced downwardly until the hinges 50A, 50B and 50C are engaged or jammed with the side faces of the index block 52. This constrains all of the extensible legs 40A—40C to invariable and preselected angles of declination with respect to the plane of the mounting block 38 in the mounting assembly 28 and, specifically, maintains the coplanar legs 40A and 40B at substantially identical angles of declination from the mounting block 38.

The target index mark 30 is in the same plane as the extensible coplanar support legs 40A and 40B (or the longitudinal axes thereof) the said coplanar legs are extended via the release couplings 54A—54C and guide slots 56A—56C until the pipe contact points X' and Y' thereof are set at a distance from the target index mark 30 equal to the internal radius R' of the pipe section PA.

The third extensible support leg 40C is then adjusted until its contact point Z' is vertically displaced in a sufficient amount to maintain the plane of the coplanar legs 40A and 40B orthogonal to the center line of a pipe section PA of a given radius R when the said coplanar legs 40A and 40B are set in a true cross-sectional or transverse plane through the pipe section PA as shown in FIGS. 5 and 6.

As in the embodiment of FIGS. 1, 2, 3 and 4, the target device 24 of the present embodiment can be placed at any reasonable angle permitted by gravity, friction and stability as long as the coplanar legs 40A and 40B are set transversely of the pipe PA as described above. Since the target screen 26 is not set in the mounting block 38 by the dowel 34 and its coaxial socket 36, the target index mark 30 (or center of the aperture 32) is always in the same plane (or in a plane immediately adjacent and parallel to) the plane of the coplanar mounting legs 40A and 40B and equidistant from the latter.

Thus, a slight deviation from a true transverse setting of the coplanar legs 40A and 40B will result in a negligible deviation of the target index mark 30 from the center line of the pipe section PA.

Further, the dependent nature of the third extensible support leg 40C (and the extended support leg 18 in the embodiment of FIGs. 1—4) when combined with the natural shape of a pipe section, is readily centered at the lowest internal linear dimension (pipe invert) of the pipe section PA (P) by the natural tendency of the human eye to achieve a centered position in such circular geometry.

Of additional advantage in large internal diameter pipe sections, when a plurality of such sections are to be layed in a string along a common established grade line, is the adaptability of the target device 24 to be accurately referenced to a uniform linear dimension line within the pipe section by installing the said target device 24 in a plumb relationship within a given pipe section.

In order to effect such an offset reference line from the center line, the target device 24 is set by the orientation linkage 44 with the coplanar extensible legs 40A and 40B at a selected equal length.

Then, a plumb bob (not shown) is hung from the axial hook 58 on the mounting dowel 34. By adjusting the position of the coplanar legs 40A and 40B within the pipe section and then by adjusting the length of the third extensible leg 40C, the plumb bob can be brought into registry with the plumb bob index 60 on the index block 52 of the orientation linkage 44. Then, in any succeeding pipe section of the same internal diameter, the identical grade reference line is established point by point in space, within said pipe section, by merely effecting plumb orientation of the preset target device 24 in the said pipe section, whereby the target index 30 (or center of the aperture 32) is constrained to coincidence with the said grade reference line.

THE SYSTEM

Further utility of the target devices 10 and 24 of the present invention is readily seen with reference to FIG. 10, wherein the new and novel pipe aligning system of the present invention is shown; and which will now be described.

Figure 10:
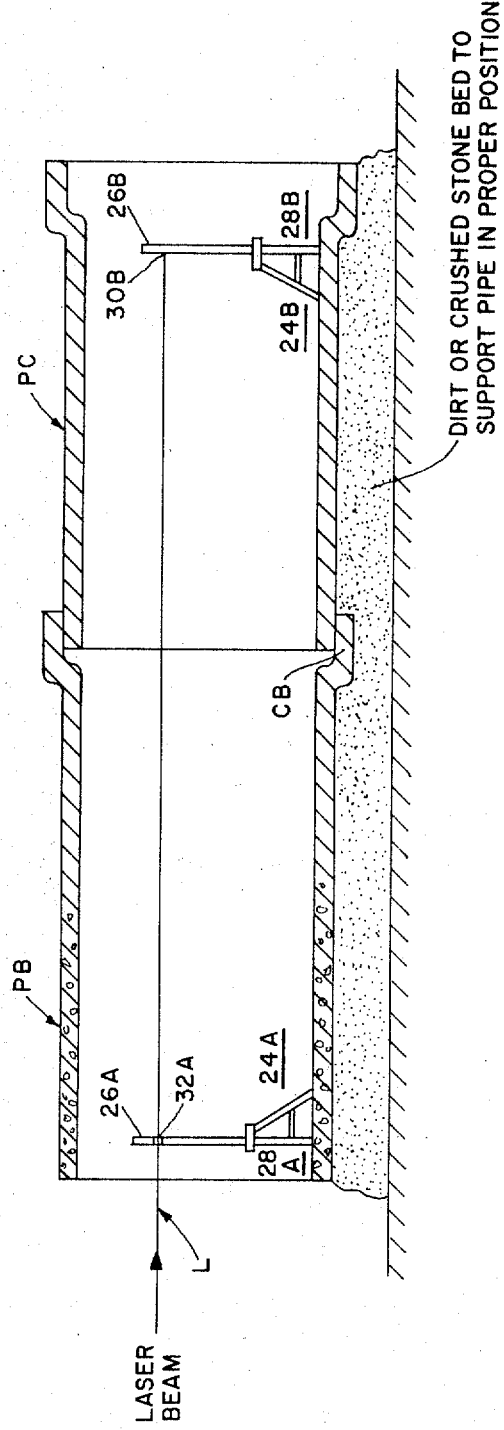
FIG. 10 is a cross section of another embodiment of target structure of the present invention shown in position with a pipe or conduit.

As shown in FIG. 10, a laser beam L is established in a given space orientation to which it is desired to reference the construction and grade orientation of a pipe string represented by a set pipe section PB and a pipe section PC which is to be coupled therewith in a precise desired alignment.

Assuming that the direction of propagation of the laser beam is from the free end of the set pipe section PB into the unset pipe section PC along the desired line of the pipe sections to be set, first target device 24A is set up at the spigot or free end of pipe section PB by either of the foregoing methods which are compatible with the orientation of the laser line L and setting of the target devices which determined the orientation of the set pipe section PB.

Pipe section PB has been set by placing target device 24B in the bell end of the pipe section, positioning the pipe section so that laser beam L passes through the aperture of target device 24A and simultaneously impinges on the target index mark 30B of the target device 24B, placing fill dirt or other support material under pipe section PB to maintain it in the desired location. Then target device 24B is removed from the bell end of pipe section PB.

The pipe sections are shown in a grade trench but the invention is by no means limited to below ground use.

The straight or spigot end of the pipe section PC is then fitted into the coupling bell CB at the other end of the pipe section PB.

Next, target device 24B is positioned in the free or bell end of pipe section PC and the pipe section PC is adjusted at its free end such that the projected laser beam L is coincidentally impinged upon the target index mark 30B on the target screen 26B of the far target device 24B while continuing to pass through the aperture 32A of target device 24A in the free end of pipe section PB.

The proper impingement of the laser beam L on the target screen 26B is readily observed visually by the red glow effected by the light scattering effect on the laser beam L of the translucent or lenticular material of the target screen 26B.

When this mutual coincidence of the laser beam L has been established with the aperture 32A and the target index mark 30B, the pipe section PC is in a substantially precise coaxial orientation with the set pipe section PB.

Sufficient fill dirt or other supporting means is then placed beneath the pipe section PC to maintain it in its properly aligned position with the set pipe section PB.

These steps are repeated for each pipe section in the string to effect precise alignment of the said pipe sections over the entire length of the pipe string. It is noteworthy that no string reference lines or other geometric reference devices are needed other than a means to generate the laser beam in a given space orientation and a pair of the target devices of the present invention.

Because of the coherent nature of a laser beam, the apertures on the apertured target screens of the present invention may be on the order of three-eighths inches in diameter.

In the foregoing system of FIG. 10, it is to be expressly understood that the target devices 10, both apertured (at 22A—22C) and indexed (at 20A—20C) may be used interchangeably with the target devices 24A and 24B and that the corresponding leveling or orientation procedures to the target devices 10 are to be applied. The target devices 10, however, are more readily adaptable to use in pipes of less than 50 inches internal diameter.

In this regard, the natural tendency of the support leg 18 of these target devices 10 to center on the pipe invert is, if anything, even more accurate in small diameter pipes than in those of large diameter.

As can now be readily seen from the foregoing description, the present invention provides new and novel target structures which maintain centering or other predetermined alignment in a variety of orientations within pipe sections or tubular conduits; and, further, a new and novel system of rapidly aligning pipe sections in precise satisfaction of predetermined grade and space orientation constraints of both individual pipe sections and a string of such pipe sections.

Thus, the present invention satisfies a long felt need in the art for an alignment system and the hardware therefore, which is optimally accurate and precise and yet of optimum simplicity.

Without further description it is believed that the advantages of the present invention over the prior art is apparent and while only several preferred embodiments of the same are illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What I claim is:

1. Target means for use in circular pipe sections providing a reference point in the interior space of said pipe sections coincident with a predetermined line parameter thereof, said target means comprising:
    a planar target screen means having at least one reference point indicia means thereon;
    first mounting means for said target screen means, substantially coplanar with said reference point indicia means and including first and second contact means adapted to engage the inner periphery of a circular pipe section, said contact means being at predetermined equidistant positions from said reference point indicia means;
    means maintaining said target screen means in a predetermined orientation with respect to said first mounting means;
    second mounting means for said target means extending and selectively adjustable in a plane which is orthogonal to that of said first and second contact means and substantially coplanar with said reference point indicia means, said second suspension means including a third contact means adapted to engage the inner periphery of said circular pipe section in said plane at a second predetermined distance from said reference point indicia means; and
    wherein said first and second contact means comprise line-contacts, adapted to be coterminately engaged with the inner periphery of a circular pipe section, to effect, in cooperation with said third contact means, orthogonal alignment of said first suspension means with the longitudinal center line of a said pipe section.

2. The invention defined in claim 1, wherein said predetermined equidistant positions of said first and second contact means are at a distance from said reference point indicia means equal to the internal radius of a said pipe section, thereby constraining said reference point indicia means to a position in space coincident with the longitudinal center line of said pipe section.

3. The invention defined in claim 1, wherein said target screen means is mounted on said first mounting means in a substantially coplanar configuration therewith.

4. The invention defined in claim 1, wherein said target screen means is mounted on said first mounting means in a substantially coplanar configuration therewith, and wherein said reference point indicia means comprises a symmetrical optical aperture formed in said target screen means and having its center as a reference point.

5. A target structure, adapted to be mounted internally of a circular pipe section and impinged upon by a laser beam established through said pipe section as a longitudinal line of reference in space, said target structure comprising, in combination:
    planar target screen means of light diffusing material having at least one reference point indicia means thereon;
    a three-point mounting structure for said target screen means having first, second and third contact means;
    said mounting structure including indexing means containing said first and second contact means and said reference point indicia means in a substantially coplanar relationship; said third contact means being adjustable in a plane orthogonal to that of said coplanar indicia means and said first and second contact means;
    wherein said three point suspension structure further comprises a rectangular block having the lower edges of its end faces as said first and second contact means and an extended support leg pivotally mounted on one longitudinal face of said block at a mounting point equidistant from the ends thereof in a plane orthogonal to said one face and having its lowermost outer extremity as said third contact means;
    wherein said target screen means has an indexing slot defined therein in alignment with said reference point indicia means; and
    wherein said indexing means comprises first and second aligned holddown means on said one face of said block at respective other mounting points equidistant from the ends thereof and adapted to be received in said indexing slot to retain said target screen means on said block in a predetermined orientation such that said reference point indicia means, said holddown means and said mounting point of said support leg are colinear.

6. The invention defined in claim 5, wherein said reference point indicia means comprises a symmetrical optical aperture through said target screen means having its center as a point of reference.

7. The invention defined in claim 5, wherein said rectangular block defines a cord of the internal cross section of a pipe in which it is mounted; and wherein said reference point indicia means on said target screen means are positioned along a line perpendicular to said cord.

8. The invention defined in claim 7, wherein each said reference point indicia means comprises a symmetrical optical aperture through said target means having its center, as a point of reference, on said line perpendicular to said cord.